US009390295B2

(12) United States Patent
Franciscus Widdershoven et al.

(10) Patent No.: US 9,390,295 B2
(45) Date of Patent: Jul. 12, 2016

(54) DEVICE WITH CAPACITIVE SECURITY SHIELD

(71) Applicant: NXP B.V., Eindhoven (NL)

(72) Inventors: Franciscus Franciscus Widdershoven, Eindhoven (NL); Viet Nguyen, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/293,730

(22) Filed: Jun. 2, 2014

(65) Prior Publication Data

US 2015/0007353 A1 Jan. 1, 2015

(30) Foreign Application Priority Data

Jun. 27, 2013 (EP) .................................. 13174078

(51) Int. Cl.
*G06F 21/87* (2013.01)
*H01L 23/00* (2006.01)
*G06F 21/77* (2013.01)
*H04L 9/08* (2006.01)
*H04L 9/32* (2006.01)
*G09C 1/00* (2006.01)

(52) U.S. Cl.
CPC ............... *G06F 21/87* (2013.01); *G06F 21/77* (2013.01); *G09C 1/00* (2013.01); *H01L 23/576* (2013.01); *H04L 9/0866* (2013.01); *H04L 9/3278* (2013.01); *H01L 2924/0002* (2013.01)

(58) Field of Classification Search
None
See application file for complete search history.

(56) References Cited

U.S. PATENT DOCUMENTS

| 8,148,686 B2* | 4/2012 | Ryhanen et al. ............... 250/330 |
| 2001/0043629 A1* | 11/2001 | Sun et al. ........................ 372/43 |
| 2003/0150562 A1* | 8/2003 | Quon ........................ 156/345.47 |
| 2006/0097991 A1* | 5/2006 | Hotelling et al. ............. 345/173 |
| 2009/0086404 A1* | 4/2009 | Masuda et al. ................ 361/303 |

FOREIGN PATENT DOCUMENTS

| WO | 2008/152577 A1 | 12/2008 |
| WO | 2012/122994 A1 | 9/2012 |

OTHER PUBLICATIONS

Kursawe, K. et al. "Reconfigurable Physical Unclonable Functions—Enabling Technology for Tamper-Resistant Storage", IEEE International Workshop on Hardware-Oriented Security and Trust, pp. 22-29 (2009).
Ravikanth, P. "Physical One-Way Functions", Massachusetts Institute of Technology Science, 154 pgs. (Mar. 2001).
Extended European Search Report for EP Patent Appln. No. 13174078.9 (Sep. 16, 2013).
Pappu, Ravikanth, et al. "Physical one-way functions." Science 297. 5589 (2002): 2026-2030.

* cited by examiner

*Primary Examiner* — David Le

(57) ABSTRACT

The invention provides a semiconductor device comprising with a capacitive security shield structure which uses a set of randomly distributed dielectric or conducting particles formed within a dielectric layer. A set of electrodes can be configured as at least two sets, wherein a first set is used to measure a capacitance characteristic, and a second set is configured as non-measurement set. The electrode configuration can be altered so that multiple measurements can be obtained.

16 Claims, 3 Drawing Sheets

DEVICE WITH CAPACITIVE SECURITY SHIELD

CROSS-REFERENCE TO RELATED APPLICATIONS

This application claims the priority under 35 U.S.C. §119 of European patent application no. 13174078.9, filed on Jun. 27, 2013, the contents of which are incorporated by reference herein.

This invention relates to devices which incorporate a capacitive security shield. This shield can implement a so-called physically unclonable function ("PUF") based on the capacitance value.

Integrated circuits (ICs) for applications such as smart-cards, RFID tags, Pay-TV chips and similar devices often contain a secret security key and carry out secret functions. The IC needs to be secure against attacks from the outside which aim at retrieving data from them.

ICs may be subjected to both front-side as well as back-side attacks. The "front-side" of a semiconductor device is defined as the side of the semiconductor device on which circuitry is provided. Likewise, the "backside" of the semiconductor device is defined as the side opposite to the front-side.

Front-side attacks may consist of opening of packaged chips, and recording electrical signals from the chip with external probes. Back-side attacks may consist of various analysis techniques such as photon emission detection, thermal infrared detection, liquid crystal detection, voltage or electric field detection, and electromagnetic detection methods.

Often these methods are used in combination with invasive attacks such as wafer thinning, laser cutting and heating, focused ion beam (FIB) techniques. Also light or laser flash methods are used from the back-side in order to force signals to flip.

To counteract these attacks, various kinds of tamper protection schemes have been reported, both for front-side as well as back-side.

Tamper protection schemes become stronger when they are combined with cryptography. So-called Physical Unclonable Functions (PUFs) were introduced by Pappu et. al. in "Physical One-Way Functions", MIT, March 2001. This disclosure presented a PUF as a cost-effective way of generating secure keys for cryptographic purposes.

A PUF is a function that is embodied in a physical structure that is easy to evaluate but hard to characterize. The physical structure that contains the PUF consists of at least one random component. This random component is introduced during the manufacturing process and cannot be easily controlled. PUFs are described for use as a hash function and for authentication purposes. Because through PUFs the key-like data is stored essentially in a material rather than in a circuit, the technology can also be used as part of a device that needs authentication, such as a tamper detection sensor.

Many further developments focus on developing different types of PUFs. The application of PUFs focuses on using PUF's as unique identifiers for smart-cards (fingerprinting) and credit cards or as a 'cheap' source for key generation (common randomness) between two parties based on the very useful properties of PUFs of the uniqueness of the responses and unclonability of the PUF.

An important aspect of a physical structure for a PUF is that its physical properties are such that an electric property, such as a capacitance or a resistance, can be derived from it which is not (easily) reproducible. This means that the respective electrical property behaves stochastically, i.e. varies within a single semiconductor device (having multiple physical structures), varies within a single batch of semiconductor devices, and varies between multiple batches.

The larger the variation of the respective electrical property the more information is contained in the PUF.

A problem with the known PUFs is that the variation of the respective electrical property is limited.

The invention is defined by the claims.

According to the invention, there is provided a semiconductor device comprising a capacitive security shield, the capacitive security shield comprising:

a set of randomly distributed dielectric or conducting particles formed within a dielectric layer;

a set of electrodes formed in a layer over which the set of particles are formed; and a controller, wherein the controller is adapted to configure the electrodes as at least two sets, wherein a first set is used to measure a capacitance characteristic, and a second set is configured as a non-measurement set, wherein the controller is further adapted to reconfigure the electrodes into a different first and second set, and the reconfigured first set is used to measure a reconfigured capacitance characteristic.

This arrangement provides multiple capacitance measurements for different electrode configurations. This increases the random nature of the capacitance function and renders cloning even more difficult.

The second set can comprise electrodes which are grounded, and/or floating, and/or applied with a modulation voltage. Thus, the second set of electrodes can be divided into sub-sets, with some grounded, some floating and some modulated. The second set of electrodes can all be the same or they can be divided into two or more of these sub-sets. The second set can be considered to be a counter electrode set, although there may be other conducting bodies which also contribute to the counter electrode function.

The first set comprises electrodes which are applied with a modulation voltage for their capacitance measurement. When a modulation voltage is applied to electrodes of the second set, the same modulation frequency and phase can be used, or the same modulation frequency and opposite phase. In general, any phase can be used. To increase randomness or entropy, reproducible random phases can be selected.

The device can comprise a memory which stores a sequence of different configurations of the electrodes. This memory information is used to define how the capacitance measurement is to take place. The memory can be part of the device which is protected by the CSS.

In one set of non-limiting examples, the electrodes can have an area of 100 μm$^2$ or less. Small electrodes are able to detect small changes in the electrode capacitances induced by small external active probe devices.

The array of electrodes may have tens to thousands of electrodes. The electrode array is typically a regular array of electrodes, whereas the particles are randomly distributed by the manufacturing process. The particles can for example have a maximum linear dimension of less than 30 μm.

The device can be used in a smart card or an RFID tag.

The invention also provides a method of extracting data from a semiconductor device which comprises a structure for use in a physically unclonable function, wherein the structure comprises a set of randomly distributed dielectric or conducting particles formed within a dielectric layer and a set of electrodes formed in a layer over which the set of particles are formed, wherein the method comprises:

configuring the electrodes as at least two sets;

measuring a capacitance characteristic using the first set, with the second set configured as a counter electrode set;

reconfiguring the electrodes as a different combination of at least two sets;

measuring a reconfigured capacitance characteristic using the first set with the second set configured as a counter electrode set.

An example of the invention will now be described in detail with reference to the accompanying drawings, in which.

The invention provides a semiconductor device comprising a CSS structure which uses a set of randomly distributed dielectric or conducting particles formed within a dielectric layer. A set of electrodes can be configured as at least two sets, wherein a first set is used to measure a capacitance characteristic, and a second set is configured as a counter electrode set. The electrode configuration can be altered so that multiple measurements can be obtained.

In this way, the invention is based on a set of single-electrode fringe capacitors that are spread over the chip area (in particular over parts that need to be protected against attacks). Each capacitor senses its local environment by measuring the spreading capacitance between its electrode plate and all objects and materials that are within the electric field lines emerging from the electrode plate.

Figure 1:
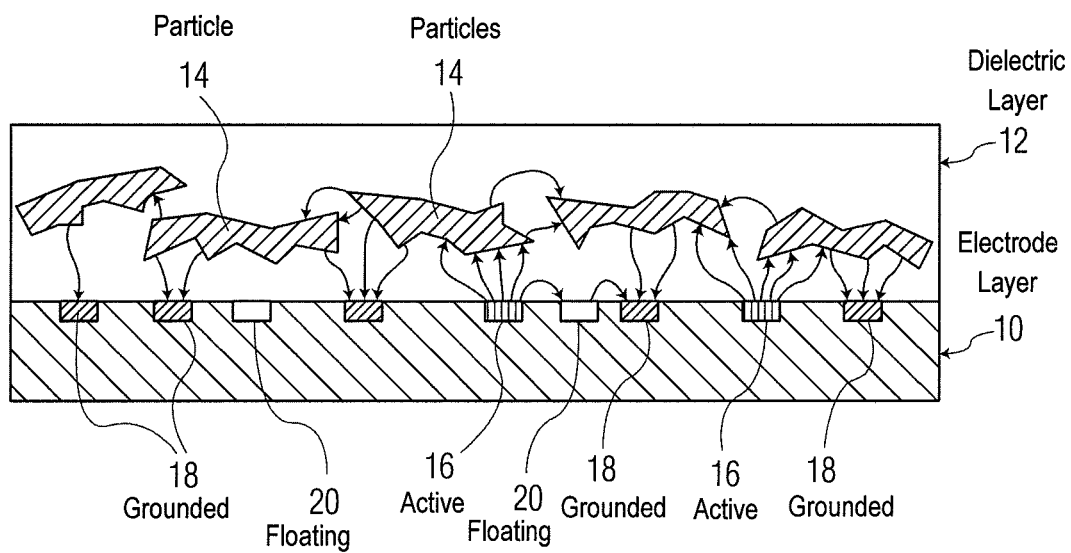
FIG. 1 shows a device of the invention.

FIG. 1 shows a layer 10 of electrodes over which a dielectric layer 12 is formed, in which randomly dispersed particles 14 are embedded.

The layer 10 can be the top metallization layer of an IC, and there is an independent connection to each electrode, which then routes to processing circuitry within the IC.

FIG. 1 shows schematically field lines formed, although electric field lines through the bottom layer are omitted.

The electrodes are divided into two sets. The first set comprises active electrodes 16. The second set comprises counter electrodes, and some of these are grounded 18 and others are floating 20.

FIG. 1 shows a cross-section through the electrodes. The dimensions of the electrodes in the direction perpendicular to the plane of the drawing are comparable to their dimensions in the plane, so that the electrodes are for example generally round or square in plan view.

In this example only grounded and floating counter electrodes are used. Only a single row of electrodes can be seen, but in practice a two dimensional array of electrodes is used.

In the example of FIG. 1, the chip is covered by a dielectric layer in which conducting particles with irregular shapes are distributed randomly. If an attacker removes part of the dielectric layer, or removes, damages or displaces one or more conducting particles, then the capacitances of active electrodes in the proximity of the attacked location changes. This change is also sensed if the removal or displacement of material was done before the chip is powered on.

Examples of the particles are:

Irregularly shaped conductive particles like flakes of metal, semiconductor, graphene, etc.; or Irregularly shaped dielectric particles with a dielectric constant that differs from that of the dielectric layer 12 in which they are embedded.

When the chip receives a supply of power, a sub-set of the electrodes is selected (the first set of active electrodes) to measure their capacitive response.

The capacitances of all active electrodes are measured separately. A capacitance typically is measured by repetitively charging and discharging the electrode's capacitance, e.g. with a logic gate as switching element, and measuring the average charge/discharge current. In the case of a logic gate switching element, the gate's dynamic power dissipation is proportional to the sum of the electrode capacitor and the gate's parasitic capacitance.

The remaining non-selected electrodes (the second set of counter electrodes) are connected in a particular connection pattern to from a collective distributed counter electrode, where the electric field lines emerging from the active electrodes terminate. Field lines can also terminal on other conductors in the vicinity. Of these counter electrodes a first sub-set can be grounded, a second sub-set can be floating, a third sub-set can be connected to a modulation voltage with the same frequency and phase as that on the active electrodes, and a fourth sub-set can be connected to a modulation voltage with the same frequency but opposite phase as that on the active electrodes.

This defines an approach with four sub-sets. However, in a simplest implementation, all electrodes of the second set can be the same—e.g. all grounded or all floating. The division of the counter electrodes (the second set) can be more complex as desired. There may even be more than the four sub-sets identified above.

Thus, different connection patterns can be created by removing, adding or modifying sub-sets of active or counter electrodes.

In the description below, a particular configuration of active and counter electrodes is referred to as a physical connection pattern.

Figure 2:
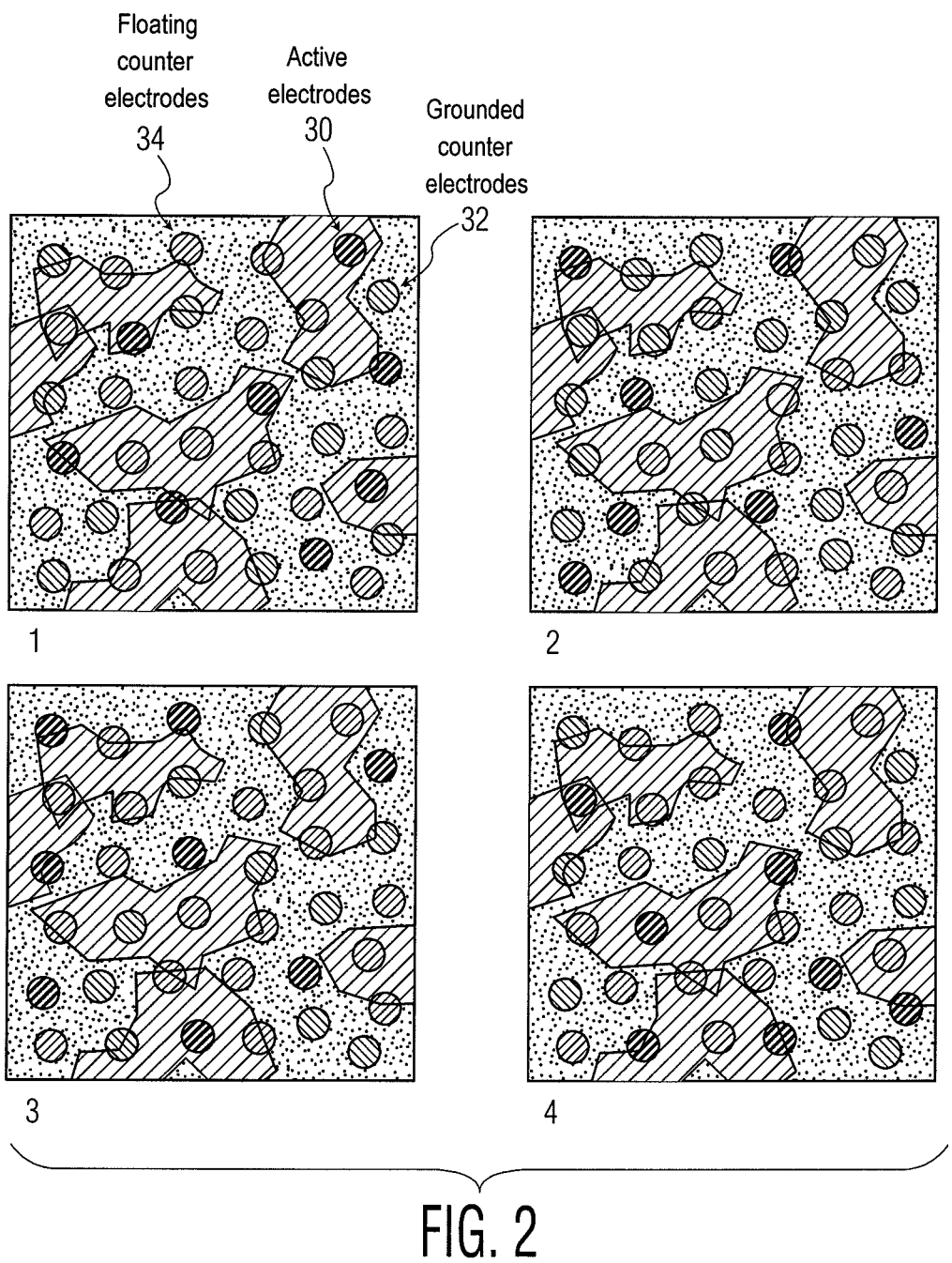
FIG. 2 shows how the device is reconfigured into different configurations for multiple measurements.

FIG. 2 shows an example of four (1 to 4) subsequent physical connection patterns of a full scan (showing a top view of part of the chip).

The active electrodes 30 are shown with one fill pattern (these are the first set). The grounded counter electrodes 32 are shown with another fill pattern (these are the first sub-set of the second set) and floating counter electrodes 34 are shown with a different fill pattern (these are the second sub-set of the second set). The irregularly shaped forms are the conductive (or dielectric) particles.

Only one of each type of electrode is referenced, but all electrodes of the same type are shown with the same fill pattern.

A full scan over the entire chip surface can be implemented by repeating a number of capacitance measurements for a set of alternative physical connection patterns. In the simplest version, there are two measurement phases. Between the measurement phases, some of the previously non-selected electrodes are made active, and some or all of the previously active electrodes are added to the sub-sets of grounded, floating, etc. counter electrodes.

In this way, a sequence of different physical connection patterns can be created and measured. FIG. 2 shows an example of 4 possible physical connection patterns of a full scan, i.e. 4 measurement phases.

The number of measurement phases needed will depend on the required randomness of the measurement, on the chip area, and on the amount of parallelism in the processing of the measurements. More parallelism gives a faster scan, but requires more hardware resources on the chip.

In an extreme case, where pairs of electrodes of a chip with 1,000-10,000 electrodes are compared sequentially in differential measurements, there can be 500-5,000 measurement phases. More realistic cases may have tens to hundreds of phases. For very accurate measurement on highly secure chips more phases can be used by reconfiguring the states of non-selected electrodes. The number of phases is also dependent on the total time available for tampering detection.

Because each individual chip is covered with a different unique pattern of particles, a given sequence of physical connection patterns will produce a unique sequence of measured capacitance values for each different chip. This makes it very hard to use information gathered about the distribution of particles in one particular chip to predict measured capacitances on another chip.

If the electrodes are made small enough then their capacitances will be less than the typical spreading capacitance of a metal probe tip that is put close enough above the dielectric layer to be able to sense electric potentials on the chip. So if someone tries to detect the electrical signal pattern produced by the active electrodes or by another circuit on the chip that is protected by the CSS by, e.g., placing a microscopic metallic tip just above the protected chip surface, then this is sensed as a change in the capacitances of the active electrodes in proximity to that tip.

By way of example, the electrode size can be a square of 1 to 5 µm side, a circle of similar diameter, or lines with similar area. The area is generally below 100 µm$^2$ so that a capacitance change which results from a small external probe can be detected. The particles can have largest linear dimension of 0.3 to 30 µm. The particle size and the particle density are chosen together to obtain the desired sensitivity of the capacitance function.

With active electric field probes, consisting of microscopic metallic tips immediately connected to local active readout electronics, it may still be possible to detect very small electric fringe fields emerging from the chip. However, for sufficient signal-to-noise ratio this typically requires long integration times. Therefore, by using very high modulation frequencies to quickly measure the capacitances of the active electrodes this way of attack is made very hard or even impossible because the on-chip capacitance measurements can be done so fast that the external active probe cannot achieve the required signal-to-noise ratio within the time that a particular physical connection pattern is present.

The time required for a capacitance measurement depends on the noise, and on the cross-talk from other signals on the chip. It also depends on the required sensitivity of the capacitance measurement. A duration of 0.03 ms-3 ms can be required for a single capacitance measurement.

With a combination of small electrodes and fast high-frequency measurements, any attempt to detect signals emerging from the chip with external probes can be detected by the chip before the attacker is able to detect the signals emerging from the chip. In case such an attack is detected the chip can be halted or powered down, so that the attacker cannot accumulate information with long-lasting measurements.

Nevertheless, an attacker may be able to reveal a fixed sequence of physical connection patterns by investigating some chips (e.g. by reverse engineering), and then use that information to perform a prepared attack on another chip. This can be prevented by mapping a fixed sequence of logical addresses into a chip-specific sequence of physical connection patterns, e.g., with an on-chip SRAM PUF or similar. As a result, each chip will have its own unique sequence of physical connection patterns. In this way it is not possible to use prior information about physical connection patterns, and their relation to the logical addresses, acquired from another chip in a prepared attack.

To avoid the mapping by the SRAM PUF being reverse engineered the SRAM PUF itself can be protected by the above CSS as well.

After production, the response pattern of each protected chip has to be read out in a secure terminal and stored in a database. Part of the database may be stored off-chip (e.g. when it is used for authentication), and part may be stored in a nonvolatile on-chip memory (when it is used for protection against attacks). This can be done by supplying a sequence of logical addresses (in case of PUFs usually called "challenges") and recording the corresponding capacitance values read from the sequence of active capacitor.

The arrangement can use electrodes buried under a scratch protection layer or other top layer. A Flash or EEPROM memory can be used for the local database; with the memory protected by the CSS itself.

Figure 3:
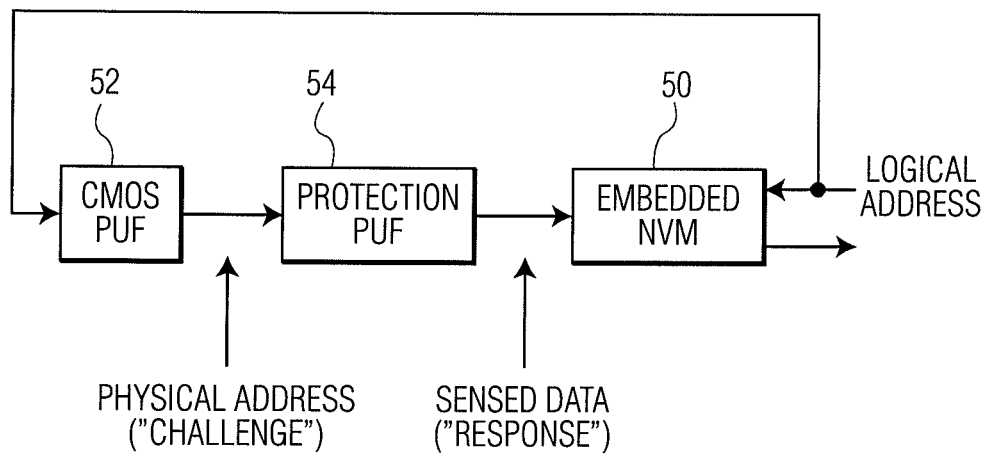
FIG. 3 shows an example of how the device is used.

FIG. 3 shows a possible use of the device of the invention. The IC comprises the embedded memory 50, the main IC to be protected 52 and the CSS structure.

During production of the chip, sets of values representing the expected evaluation result of the CSS 54 are stored in the chip's internal non-volatile memory 50. An attempt to remove the passivation layer, for example in case of reverse engineering of the chip, will irreversibly damage the CSS (i.e. the random structure of particles) and the evaluation result of the CSS will permanently deviate from the expected result.

Thus, the chip can evaluate the CSS by the capacitance sensing and compare the evaluation result with the set of reference values in order to determine whether or not the passivation layer has been removed.

If the passivation layer is removed and/or replaced, the change can be detected by the chip autonomously in a relatively easy way. The CSS of the invention, using randomly distributed conducting particles in the passivation layer of the chip, protects the surface of the chip in combination with a relatively easy detection scheme.

By using a mapping of logical address to physical electrode configuration, a unique fingerprint is provided for each chip, so that reverse engineering from a non-functional chip cannot be used to tamper another still functional chip.

In order to use the chip, a logical address of the embedded non volatile memory 50 is accessed. This defines the configuration pattern. The pattern is implemented by the integrated circuit 52 (which thus functions as the controller). For the pattern, the set of capacitance measurements are obtained from the protection CSS 54 based on a challenge and response.

The sensed data is output is then verified based on the stored data (or else it can be verified externally).

The electrodes are typically electrodes 5-25 µm apart, depending on their size and shape, and on the required sensitivity. Typically all logic area and memory peripherals (e.g. address decoders) would be protected by the CSS.

Optionally other circuits can be protected as well. In secure chips, the memory content typically is encrypted, and therefore doesn't necessarily need to be protected by the CSS, but it may be beneficial to protect address decoders, etc.

The invention is of interest for encryption functions, as well as to protect a semiconductor device against tampering, i.e. attempts to obtain data stored in the semiconductor device, for example a smartcard or an RFID tag. Especially, when there is an encryption key stored in the semiconductor device a hacker may want to try to find the key in order to obtain the valid data.

The physical structure in accordance with the invention may be advantageously applied (i.e. deposited) on top of an interconnect stack of a semiconductor device comprising an electronic circuit with secure data. Then, while trying to access the semiconductor device from the front-side the capacitance value is changed which affects the encryption key extracted. In other words, it has become very difficult to find the valid data stored in the semiconductor device.

The invention may be applied in various application areas. For example, the invention may be applied in data security for smartcards, RFID tags, Pay-TV chips, and such like. Such chips often contain a secret security key (encryption key) and carry out secret functions. The encryption key may be advantageously extracted from the physical structure in the semiconductor device in accordance with the invention.

The invention may also be used for securing communication with, for example, a mobile phone by an internal secure key. This may then be instead of identification via the SIM card which can easily be copied.

The protected semiconductor device can take any known form.

It is noted that the term "physically unclonable function" does not imply an absolutely non clonable feature. It simply means that the complexity of the physical structure is such that it is not feasible to physically replicate or computationally model the structure.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The mere fact that certain measures are recited in mutually different dependent claims does not indicate that a combination of these measures cannot be used to advantage. Various modifications will be apparent to those skilled in the art.

The invention claimed is:

1. A semiconductor device comprising a capacitive security shield, the capacitive security shield comprising:
   a set of randomly distributed dielectric or conducting particles formed within a dielectric layer;
   a plurality of electrodes formed in a layer over which the set of particles are formed; and
   a non-volatile memory storing a sequence of configuration patterns;
   a controller circuit coupled to the non-volatile memory and configured and arranged to
      retrieve the sequence of configuration patterns from the memory, one at a time, each configuration pattern indicative of a respective subset of the plurality of electrodes; and
      for each retrieved configuration pattern, reconfiguring the plurality of electrodes for measuring a capacitance characteristic via the respective subset of electrodes indicated in the configuration pattern; and
   wherein for a first one of the configuration patterns the reconfiguring by the controller circuit configures the electrodes as at least two sets, wherein a first set is used to measure a capacitance characteristic, and a second set is configured as a non-measurement set, wherein for a second one of the configuration patterns, the reconfiguring by the controller circuit reconfigures the electrodes into a third set and a fourth set that are different than the first and second sets, and the third set is used to measure a reconfigured capacitance characteristic.

2. A device as claimed in claim 1, wherein the second set comprises electrodes which are grounded.

3. A device as claimed in claim 1, wherein the second set comprises electrodes which are at a floating potential.

4. A device as claimed in claim 1, wherein the second set comprises electrodes which are applied with a modulation voltage.

5. A device as claimed in claim 4, wherein the first set comprises electrodes which are applied with a modulation voltage, and wherein electrodes of the second set have the same modulation signal.

6. A device as claimed in claim 4, wherein the first set comprises electrodes which are applied with a modulation voltage, and wherein electrodes of the second set electrodes have an inverse modulation signal.

7. A device as claimed in claim 1, comprising a memory which stores a sequence of different configurations of the electrodes.

8. A device as claimed in claim 1, wherein the electrodes have an area of 100 μm$^2$ or less.

9. A device as claimed in claim 1, wherein the particles have a maximum linear dimension of less than 30 μm.

10. A card, secure chip or an RFID tag comprising a device as claimed in claim 1.

11. A method of extracting data from a semiconductor circuit device comprising a structure for use in a physically unclonable function, wherein the structure comprises a set of randomly distributed dielectric or conducting particles formed within a dielectric layer and a plurality of electrodes formed in a layer over which the set of particles are formed, wherein the method comprises:
   retrieving a sequence of configuration patterns from a memory, one at a time, each configuration pattern indicative of a respective subset of the plurality of electrodes; and
   for each retrieved configuration pattern, reconfiguring the plurality of electrodes for measuring a capacitance characteristic via the respective subset of electrodes indicated in the configuration pattern, wherein for a first one of the plurality of reconfiguration patterns, the reconfiguring includes configuring the electrodes as at least two sets, including a first set and a second set, and wherein for a second one of the plurality of reconfiguration patterns, the reconfiguring includes reconfiguring the electrodes as a different combination of the at least two sets;
   measuring a capacitance characteristic using the first set, with the second set configured as a non-measurement set;
   and
   measuring a reconfigured capacitance characteristic using the first set with the second set configured as a non-measurement set.

12. A method as claimed in claim 11, comprising setting the voltage of electrodes of the second set to:
   ground; and/or
   a floating potential; and/or
   a modulation voltage or its inverse.

13. A method as claimed in claim 12, comprising measuring a capacitance characteristic by applying a modulation voltage to the electrodes of the first set, and applying to the electrodes of the second set the same signal.

14. A method as claimed in claim 12, comprising measuring a capacitance characteristic by applying a modulation voltage to the electrodes of the first set, and applying to the electrodes of the second set the opposite modulation signal.

15. A method as claimed in claim 11, for use in an authentication procedure.

16. A device as in claim 1, wherein at the third set includes at least one electrode included in the second set and the fourth set includes at least one electrode included in the first set.

* * * * *